United States Patent Office.

JOHN POOL, OF HERMON, NEW YORK.

Letters Patent No. 95,376, dated September 28, 1869.

IMPROVED COMPOUND FOR THE CURE OF CHOLERA-MORBUS.

The Schedule referred to in these Letters Patent and making part of the same.

*To all whom it may concern:*

Be it known that I, JOHN POOL, of the town of Hermon, in the county of St. Lawrence, and State of New York, have invented a new and improved Medicine or Compound for the cure of diseases known as the cholera-morbus and bloody flux; and I do hereby declare that the following is a full and exact description of compounding the same; also, its operation.

It is compounded as follows:

For one gallon of the compound, take three ounces of spice-root, six ounces of blackberry-root, three ounces golden jewel, three ounces buckthorn-brake root, four ounces crane's-bill root, three ounces wandering milk-weed root, four ounces water-nettle root, one ounce sumach-root, five ounces green-ozier bark, one ounce choke-cherry bark; add one and one-half gallon of water; boil the whole over a slow fire until it is reduced to one gallon; then strained and settled; then add one pound of refined sugar and one quart of alcohol.

What I claim as my invention, and desire to secure by Letters Patent, is—

The compounding of roots of blackberry, golden-jewel, buckthorn-brake, crane's-bill, wandering milk-weed, water-nettle, and sumach, with the barks of green-ozier and choke-cherry, substantially in the manner as above specified.

JOHN POOL.

Witnesses:
E. B. WHITE,
S. G. HAMLIN.